United States Patent

McDonald

[11] Patent Number: 5,868,163
[45] Date of Patent: Feb. 9, 1999

[54] FLOW RESTRICTION DEVICE

[76] Inventor: Christopher William McDonald, 43 Hospital Road, Concord West 2138, Australia

[21] Appl. No.: 786,791

[22] Filed: Jan. 21, 1997

[30] Foreign Application Priority Data

Jan. 25, 1996 [AU] Australia .................................. PN7764

[51] Int. Cl.$^6$ ............................ F16K 21/00; B05B 1/00
[52] U.S. Cl. ..................... 137/561 A; 137/801; 239/596
[58] Field of Search ............................... 137/801, 561 A; 239/596, 597

[56] References Cited

U.S. PATENT DOCUMENTS

| | | | |
|---|---|---|---|
| 1,641,017 | 8/1927 | Staples | 239/596 |
| 1,958,038 | 5/1934 | Fraser | 239/596 |
| 3,203,629 | 8/1965 | Goddard | 239/596 |

FOREIGN PATENT DOCUMENTS

| | | |
|---|---|---|
| 94987 | 11/1983 | European Pat. Off. . |
| 145232 | 2/1968 | New Zealand . |
| 158069 | 10/1971 | New Zealand . |

Primary Examiner—A. Michael Chambers
Attorney, Agent, or Firm—Frommer, Lawrence & Haug LLP; William S. Frommer

[57] ABSTRACT

A flow control device (40) which is to be inserted in the valve seat of a tap. The flow control device (40) includes a threaded section (48) to threadably engage an associated tap within which the device (40) is located. The device (40) includes a passage (42) which terminates internally of the body (43). Passages (44) radiate from the passage (45) through the body to a peripheral surface (45). The end face (47) of the device (40) is intended to be engaged by the washer of the tap.

10 Claims, 1 Drawing Sheet

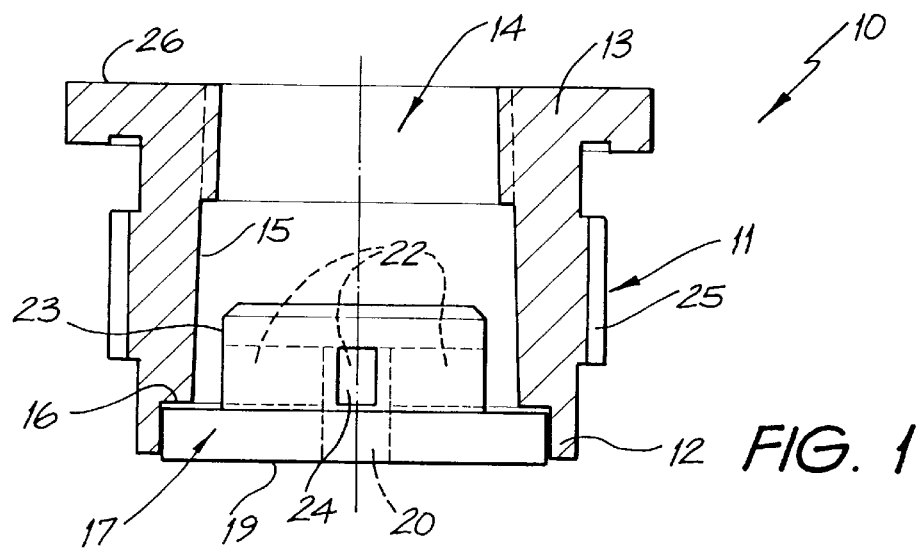
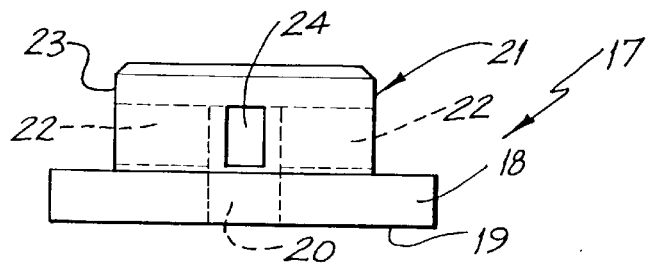
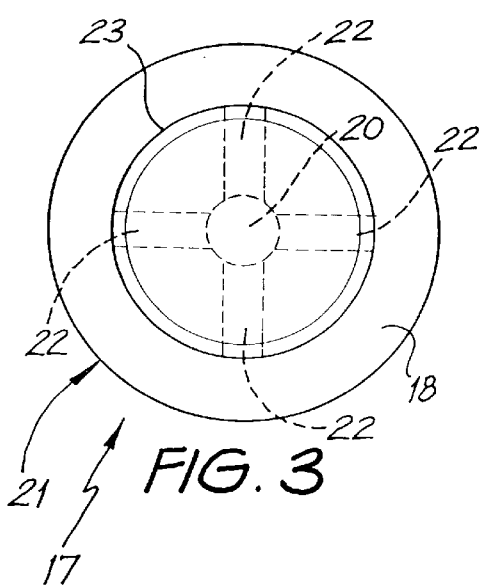
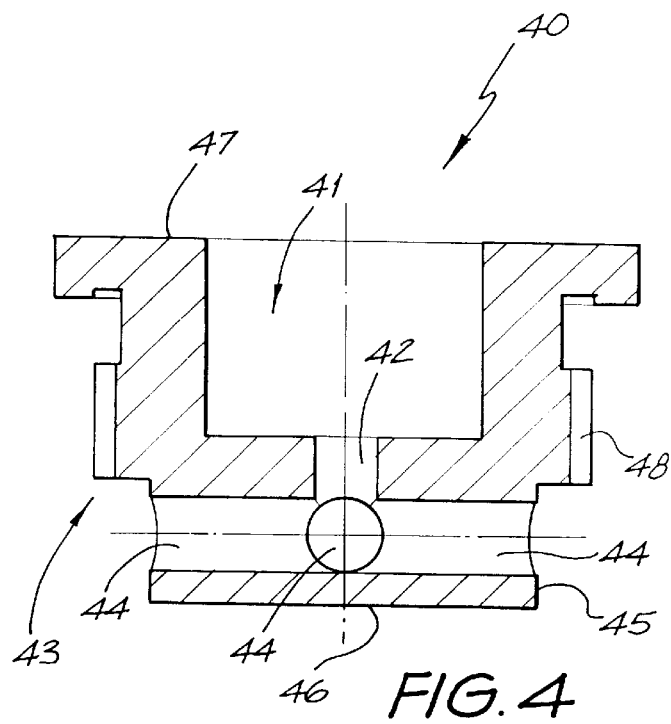

FLOW RESTRICTION DEVICE

TECHNICAL FIELD

The present invention relates to flow control devices and more particularly but not exclusively to flow control devices for taps.

BACKGROUND OF THE INVENTION

It is desirable to control the maximum flow from a tap. To this end, previous devices have been proposed, such as the flow control device described in Australian Patent 599955.

Previous flow control devices have been relatively expensive to manufacture and do not provide desirable flow characteristics.

OBJECT OF THE INVENTION

It is the object of the present invention to overcome or substantially ameliorate the above disadvantages.

SUMMARY OF THE INVENTION

There is disclosed herein a fluid flow control device including a body having an end face, a passage extending inwardly of the body from said end face, a peripheral surface, and a plurality of passages extending generally radially outwardly from said passage to said peripheral surface. Preferably the above described device is located in a surrounding housing having a cavity into which the device is received so that the radially extending passages terminate at apertures spaced from but adjacent to surfaces of the housing.

BRIEF DESCRIPTION OF THE DRAWINGS

Preferred forms of the present invention will now be described by way of example with reference to the accompanying drawings wherein:

FIG. 1 is a schematic section side elevation of an assembly to aid in controlling the flow of water through a tap;

FIG. 2 is a schematic side elevation of a device constituting an insert forming part of the assembly of FIG. 1;

FIG. 3 is a schematic end elevation of the insert of FIG. 3; and

FIG. 4 is a schematic section side elevation of an alternative insert.

DETAILED DESCRIPTION OF THE PREFERRED EMBODIMENTS

In FIGS. 1 to 3 of the accompanying drawings there is schematically depicted an assembly 10 to aid in controlling the flow of water through a tap. The assembly 10 includes an outer housing 11 having an upstream end 12 and a downstream end 13. The upstream end 12 is subjected to water under pressure so as to regulate the flow of water delivered to the downstream end 13.

The housing 11 is formed with a longitudinal central passage 14.

The passage 14 is provided with an annular step 16 which supports a flow control or restriction device 17 which is in the form of an insert locatable in the passage 14. The insert 17 includes a body 21 having an end disc shaped portion 18 provided with a generally planar end face 19. Extending inwardly of the body 21 from the end face 19 is a main passage 20. The passage terminates internally of the body 21. Extending radially from the passage 20 are further branch passages 22 terminating at the peripheral surface 23. More particularly, the passages 22 terminate at apertures 24 formed in the peripheral surface 23.

The passage 14 has an internal surface 15 adjacent to but spaced from the peripheral surface 23.

In operation of the above described assembly 10, water under pressure is delivered to the end face 17. The water flows along the passage 20 and turns to flow radially out through the passages 22. Jets of water then exit from the insert 17 via the apertures 24. The size of the passage 20 essentially determining the resistance of the assembly 10 to fluid flow therethrough.

In FIG. 4 there it schematically depicted a fluid flow control device 40. In this embodiment, the device 40 includes a main passage 41 including to a narrower passage portion 42 which terminates internally of the body 43. Extending radially from the passage portion 42 are further passages 44 which extend to the radially outer peripheral surface 45 of the body 43. In this embodiment, the end face 46 is the upstream end and the end face 47 is the downstream end.

The size of the passage portion 42 is dimensioned to provide the desired restriction. For example, if the diameter is larger than what is depicted in FIG. 4, then the device 40 will offer less resistance. However, if the diameter is smaller, then the device 40 will provide greater resistance.

In the assembly of FIG. 1, the housing 11 is provided with a threaded section 25 while in the embodiment of FIG. 4, the device 40 has a threaded section 48. The threaded sections 25 and 48 are provided so that when the assembly 10 or device 40 is incorporated in a tap, the value passage extending from the tap value seat is threaded so that the threaded section 25 or 48 can be received therein. The tap washer would then engage the upper surface 26 of the housing 11 or the end face 47 of the device 40.

In a still further arrangement, the assembly 10 or the device 40 could be arranged to be located below the level of the seat within the tap so that the tap washer still engages the seat.

I claim:

1. A fluid flow restriction device configured to be received within a valve passage of a tap, said device comprising:
    a body to be located within the valve passage;
    an end face on the body;
    a main passage extending inwardly of the body from the end face and terminating within the body;
    a peripheral surface on the body extending about said passage and spaced radially therefrom; and
    a plurality of branch passages extending generally radially from the main passage so as to provide a restriction to flow through the body, the branch passages extending to said peripheral surface.

2. The fluid flow control device of claim 1 wherein said passage has a longitudinal axis and said peripheral surface extending angularly about said axis and said branch passages extend to said peripheral surface and terminate with apertures in said peripheral surface.

3. In combination, the device of claim 2 and a tap having a valve passage extending from a valve seat, which valve seat is to be engaged by a washer, and wherein said device is secured with said valve passage.

4. The combination of claim 3, wherein said end face is positioned to be engaged by the washer.

5. The combination of claim 3, wherein said end face is displaced inwardly along the valve passage so that the washer engages said seat.

6. The flow control device of claim 1, wherein said end face is adapted to be engaged by a tap washer.

7. The device of claim 1, further including a housing having a cavity in which said body is located, said cavity having a surface facing said peripheral surface but spaced therefrom.

8. The device of claim 5 wherein said housing has an end face from which said cavity extends, the housing end face being provided to be engaged by the washer, said cavity is provided by a passage extending from the housing end face, and said body projects into the housing passage so that the housing passage provides an inlet and an outlets for the main passage.

9. In combination, the device of claim 8 and a tap having a valve passage extending from a valve seat, and wherein said housing is positioned so that the housing end face is engaged by the washer.

10. The device of claim 1, wherein said device has a threaded portion to threadable engage the valve passage.

* * * * *